United States Patent [19]
Ellison

[11] Patent Number: 5,456,016
[45] Date of Patent: Oct. 10, 1995

[54] GAUGE TO INDICATE A CORRECT ALIGNMENT FOR THE THUMB HOLE OF A BOWLING BALL

[76] Inventor: John D. Ellison, 2451 W. 234th St., Torrance, Calif. 90501

[21] Appl. No.: 265,378

[22] Filed: Jun. 23, 1994

[51] Int. Cl.⁶ .............................. G01B 3/14; G01B 3/56; G01B 5/25
[52] U.S. Cl. .................. 33/510; 33/562; 473/128
[58] Field of Search .......................... 33/509, 510, 562, 33/566, 21.2, 21.1; 473/125, 127, 128; 273/58 R

[56] References Cited

U.S. PATENT DOCUMENTS

| | | | |
|---|---|---|---|
| 2,349,394 | 5/1944 | Widdis | 33/509 |
| 3,182,404 | 5/1965 | Fleming et al. | 33/510 |
| 3,415,146 | 12/1968 | Schroeder, Jr. | 33/510 |
| 3,875,668 | 4/1975 | Taylor | 33/509 |
| 5,181,325 | 1/1993 | Damon | 33/510 |

Primary Examiner—Christopher W. Fulton
Attorney, Agent, or Firm—Donald D. Mon

[57] ABSTRACT

A gauge for indicating the correct alignment for a thumb hole of a bowling ball having a ring with a circular abutment section having a central axis, the ring having an aperture through the opening inside the abutment section, the ring also having a circular track concentric and coaxial with the central axis and angular indicia on the ring. A fin is attached to the ring extending in a plane which includes the central axis. A thumb plate having a periphery which fits and rotates in the track, the thumb plate having a centrally located thumb aperture with a boundary having a generally flattened portion against which the top of the thumb will bear and an opposite generally rounded portion against which the bottom of the thumb will bear, the thumb plate also having an index mark to align with the angular indicia on the ring to indicate the correct angular orientation of the thumb hole to be drilled in the bowling ball.

5 Claims, 2 Drawing Sheets

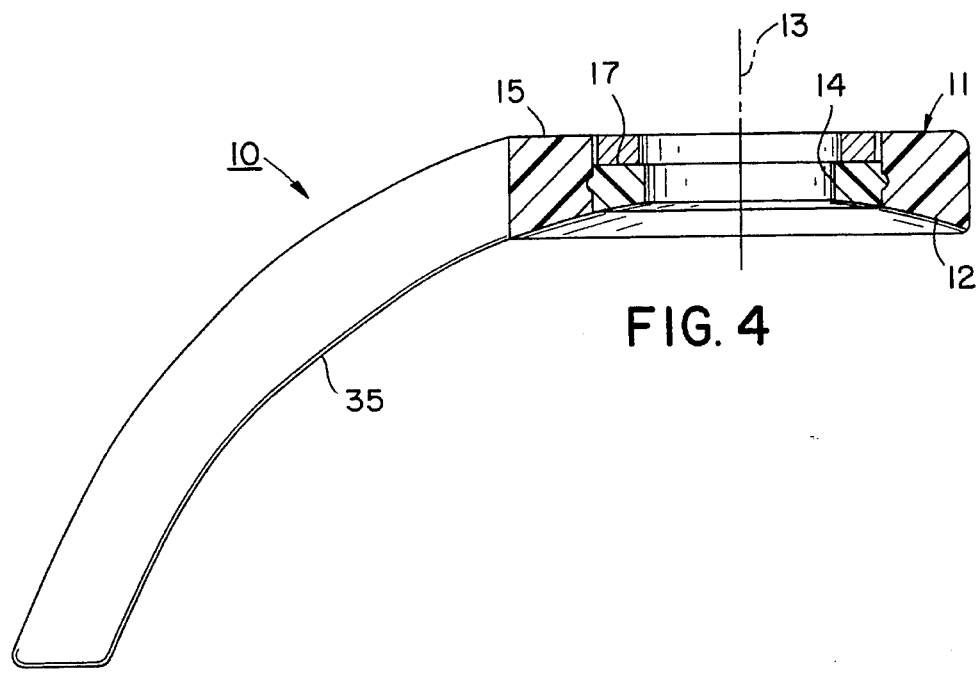
FIG. 4
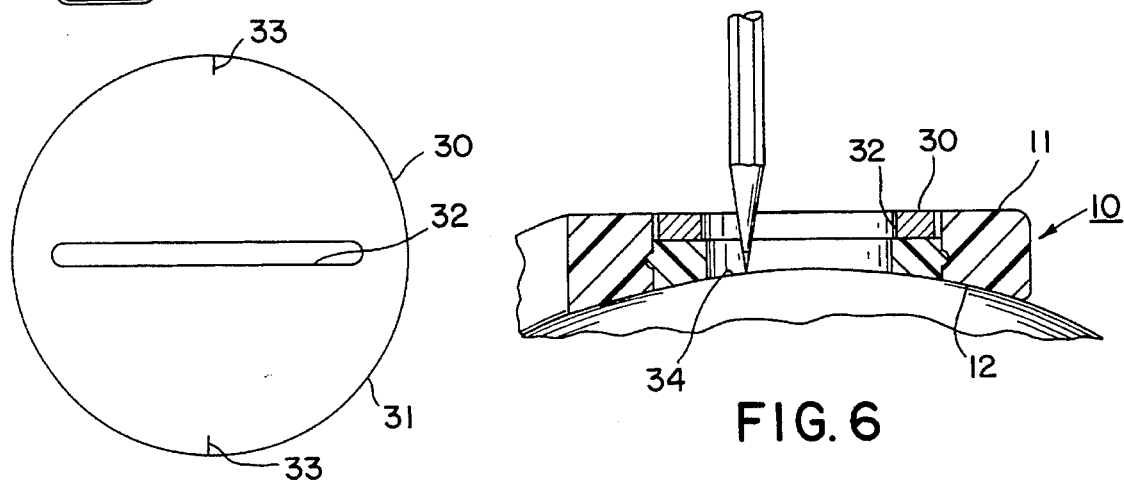
FIG. 5
FIG. 6
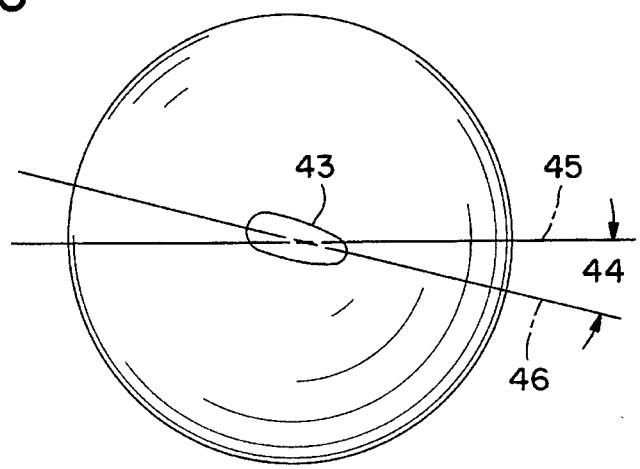
FIG. 7

GAUGE TO INDICATE A CORRECT ALIGNMENT FOR THE THUMB HOLE OF A BOWLING BALL

FIELD OF THE INVENTION

This invention relates to the drilling of thumb holes in bowling balls.

BACKGROUND OF THE INVENTION

Bowling balls are generally drilled to provide holes for two fingers and one hole for the thumb. The centers of these holes are preferably at the apices of an isosceles triangle, with the thumb hole centered on the intersection of the surface of the ball and a polar plane which is perpendicular to and bisects the line drawn between the centers of the finger holes.

The finger holes are usually drilled round and the fingers are comfortably received in them. Also, many bowlers prefer not to have finger holes at all, However, the thumb hole presents different problems, and a thumb hole is always used.

The bowler holds the ball with his thumb in the thumb hole with his four fingers divided in pairs, one pair on each side of the polar plane on which the thumb hole is centered. When finger holes are provided, one finger on each side goes into a respective finger hole. This means that the thumb will have to be rotated in order to reach its central position. If the thumb itself is round there is no problem. However, less than 10% of people have circular thumbs. Instead they are flattened and ovalled, so an oval hole is to be preferred for comfort and accuracy of throw. A hole which does not reasonably approximate the angular orientation and shape of the thumb will result in considerable physical irritation.

However, the angle which the thumb makes relative to the polar plane differs widely among people, so that an oval hole whose major axis is tilted at one angle may be suitable for one person and be completely unsuitable for another person. Plugging unsuitable holes and redrilling a ball is expensive, usually costing on the order of $20.00 each time. Customers understandably become impatient when the bowling professional drills too many unsuitable holes.

One problem with the most accurate known drilling procedure is that the cost of a machine tool to drill an oval hole at a precise angle is beyond the reach of many bowling pros. Instead a hand-held powered grinder is used, and for this the pro has little or no guidance to form a correctly oriented ovalled thumb hole.

It is an object of this invention to provide a gauge to determine the correct alignment of the major axis of an ovalled hole for each individual, and to provide a visible line to guide the pro showing the correct angle for the major axis so that even with a hand-held tool the pro can correctly align the hole he is drilling.

BRIEF DESCRIPTION OF THE INVENTION

A gauge according to this invention includes a ring having a circular abutment section with a central axis to fit against the surface of a bowling ball. The ring includes a central aperture, and a circular track concentric and coaxial with the abutment section.

A thumb plate is rotatably and removably fitted to the track. The thumb plate has a central aperture that is shaped to receive the end of the thumb of the user, with a flattened edge for contact with the flattened top of his thumb.

A fin is attached to the ring and extends in a plane which includes the central axis of the abutment section. When the fin is placed between the second and third fingers, and the abutment section rests on the ball, the fin will lie in a polar plane, and the thumb when inserted in the operation of the thumb plate will be centered on that plane. The thumb plate will have rotated to the correct angle of the thumb, and from this setting of the thumb plate, the thumb angle will be known. For many users this will be adequate information.

According to a preferred but optional feature of the invention, a scribe plate having a linear slot can be substituted for the thumb plate at its same angle, and a scribe instrument such as a pencil or a point, can be run along the slot to indicate the correct major axis for an ovalled hole to be drilled.

Conveniently, when the ball already has two finger holes, the two fingers can be inserted in them with the fin between the second and third fingers, thereby accurately to locate the position of the thumb hole as well as its major axis.

The above and other features of this invention will be fully understood from the following detailed description and the accompanying drawings, in which:

BRIEF DESCRIPTION OF THE DRAWINGS

FIG. 4 is a side view, partly in cutaway cross-section showing the preferred embodiment of the invention;

FIG. 5 is a top view of a scribe plate for use with the device of FIG. 4;

FIG. 6 is a cross-section showing the scribe plate in use; and

FIG. 7 is a polar view of a correctly drilled thumb hole.

DETAILED DESCRIPTION OF THE INVENTION

Figure 3:
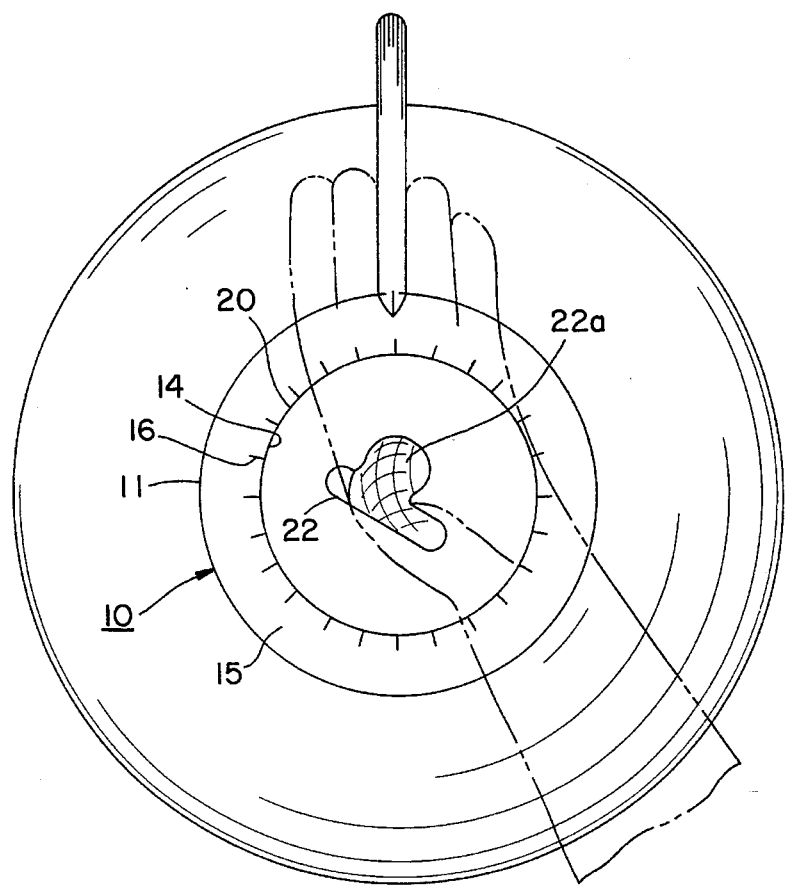
FIG. 3 is a top view of FIG. 4 showing a user's hand in phantom notation, rotating the thumb plate to an appropriate setting.

A gauge 10 according to this invention is shown in FIG. 3. It includes a gauge ring 11 having a circular abutment section 12 to be held against the surface of a bowling ball. The abutment section has a central axis 13.

The ring has an aperture 14 and an upper surface 15 which can be provided with angular indicia 16 which can be graded in degrees. The upper surface is recessed to form a circular track 17 which is coaxial with central axis 13.

A thumb plate 20 has a circular periphery 21 that fits in and rotates in the track. It includes a central aperture 22 which is shaped to receive the end of the user's thumb (22a in FIG. 3). It has a generally flattened portion 23 against which the top of the thumb just below the thumb nail will bear, and a generally rounded opposite portion 24 against which the bottom of the thumb will bear. Because of this shape, a nominal axis 25 exists, generally aligned with the flattened portion, which will ultimately indicate the correct major axis for an oval hole which is to be drilled in a bowling ball for use with this particular thumb. The thumb plate will bear an index mark 26 whose position is to be indicated relative to the gauge ring.

An optional scribe plate 30 has a circular periphery 31 which can be placed in said track to rotate in it. It includes a linear slot 32. An index mark 33 similar to index mark 26 on the thumb plate is placed on the scribe plate. Then, when the scribe plate replaces the thumb plate with its index mark relative to the ring where the index mark of the thumb plate was, the slot lies on the intended major axis of an oval hole.

A scribe device such as a pencil or a pointed instrument can be placed in the slot and run along it with its end in contact with the bowling ball. These results a guide line 34 whose center can also be indicated, to guide the pro as he generates the hole.

Figure 1:
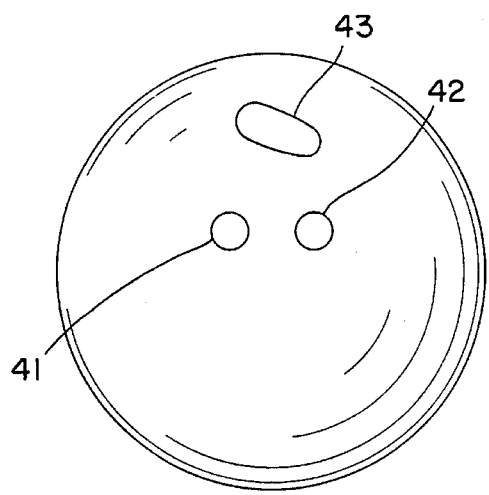
FIG. 1 is a side view of a bowling ball with a correctly-drilled thumb hole.
Figure 2:
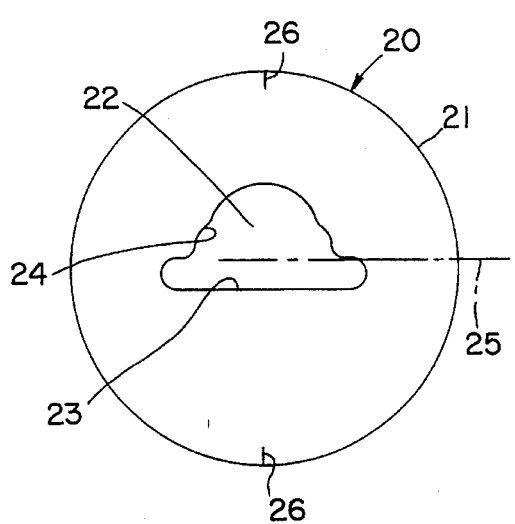
FIG. 2 is a plan view of a thumb plate used in the invention.

FIG. 1 is a side view of a bowling ball having two finger holes 41, 42 and a correctly placed ovalled thumb hole 43. It is centered on the perpendicular bisector of a line between the two fingers holes, and on the polar plane normal to the sheet of FIG. 1. Its angularity relative to the plane is the subject of this invention, and is best shown in the polar view of FIG. 7, where an angle 44 is shown between two polar planes 45, 46, polar plane 45 being the perpendicular bisector of the line between the two finger holes. Finger holes are not shown in FIGS. 3 and 7, because they are not necessary for the use of this invention. When a thumb hole is to be drilled in a ball that will not ultimately have finger holes, the location of the thumb hole is not important.

The major axis of thumb hole 43 is on guide line 34, where the setting of the thumb plate determined angle 44.

Some pro shops have mechanical equipment to move the ball relative to the drill or grinder. In such cases the scribe plate need not be used. The reading of the index mark of the thumb plate relative to the ring is the only required information.

It will be noted that the ring need not be on the surface of the ball to make the angular determination, but it will usually be preferred, especially when finger holes already exist. It is a convenience for the fin to have an engagement surface 35 with a curvature equal to that of the bowling ball, and located such that when it contacts the ball, so will the abutment section of the ring.

There results a simple gauge member which can establish a correct major axis for the thumb hole, and also if desired indicate the location for the proper center of the thumb hole and its major axis.

This invention is not to be limited by the embodiment shown in the drawings and described in the description, which is given by way of example and not of limitation, but only in accordance with the scope of the appended claims.

I claim:

1. A gauge for indicating the correct alignment for a thumb hole of a bowling ball, comprising:

a ring having a circular abutment section with a central axis, an aperture through said ring opening inside said abutment section, a circular track on said ring concentric and coaxial with said central axis, and angular indicia means on said ring extending around and adjacent to said aperture;

a fin attached to said ring extending in a plane which includes said central axis; and a thumb plate having a periphery which can fit in and rotate in said track, said thumb plate having a centrally located thumb aperture with a boundary having a generally flattened portion against which the top of the thumb will bear when the thumb is inserted in the thumb aperture, and an opposite generally rounded portion against which the bottom of the thumb will bear, and an index mark on said thumb plate disposed opposite said indicia means when said plate is fitted in said thumb to indicate the relative angular position of the thumb plate relative to the ring, and thereby to indicate the correct angular orientation of a thumb hole to be drilled in a bowling ball.

2. A gauge according to claim 1 in which said fin has an arcuate edge with the same curvature as a bowling ball against which said abutment section will be placed.

3. A gauge according to claim 1 in which a scribe plate having a circular periphery can fit and rotate in said track, a linear slot, and an index mark corresponding in angular position to the index mark of the thumb plate.

4. A gauge according to claim 3 in which said slot has a dimension of width such as to guide a marking instrument to mark the correct angle of a thumb hole to be drilled.

5. A gauge according to claim 4 in which said fin has an arcuate edge with same curvature as a bowling ball against which said abutment section will be placed.

* * * * *